(12) United States Patent
Masuda

(10) Patent No.: US 10,976,650 B2
(45) Date of Patent: Apr. 13, 2021

(54) LIGHT SOURCE UNIT AND PROJECTION APPARATUS

(71) Applicant: CASIO COMPUTER CO., LTD., Tokyo (JP)

(72) Inventor: Hiroki Masuda, Akishima (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 40 days.

(21) Appl. No.: 16/230,856

(22) Filed: Dec. 21, 2018

(65) Prior Publication Data

US 2019/0212639 A1 Jul. 11, 2019

(30) Foreign Application Priority Data

Jan. 9, 2018 (JP) .............................. JP2018-000937

(51) Int. Cl.
*G03B 21/20* (2006.01)
*G09G 3/00* (2006.01)
(Continued)

(52) U.S. Cl.
CPC ......... *G03B 21/204* (2013.01); *G02B 26/008* (2013.01); *G03B 21/2013* (2013.01);
(Continued)

(58) Field of Classification Search
None
See application file for complete search history.

(56) References Cited

U.S. PATENT DOCUMENTS 9,843,780 B2 12/2017 Ogawa
2013/0107230 A1 5/2013 Murai
(Continued)

FOREIGN PATENT DOCUMENTS

JP 2013-118172 A 6/2013
JP 2014240912 A * 12/2014
(Continued)

OTHER PUBLICATIONS

English machine translation of Japanese patent publication JP 2014-240912A. (Year: 2014).*
(Continued)

*Primary Examiner* — Nicholas J Lee
(74) *Attorney, Agent, or Firm* — Fitch, Even, Tabin & Flannery LLP

(57) ABSTRACT

A light source unit includes: a first light emitting element configured to emit a first wavelength band light; a second light emitting element configured to emit a second wavelength band light; a luminescent wheel configured to have a first fluorescent light emitting region irradiated with the second wavelength band light to emit a third wavelength band light, and a second fluorescent light emitting region that emits a fourth wavelength band light including a wavelength band of the first wavelength band light and the third wavelength band light having a wavelength band adjacent to the first wavelength band light being provided in parallel in a circumferential direction; a color wheel configured to have a second transmissive region that transmits the first wavelength band light to the fourth wavelength band light, and a third transmissive region that transmits only the first wavelength band light or transmits only the first wavelength band light and the second wavelength band light being installed in parallel in the circumferential direction, and synchronously rotate with the luminescent wheel; and a controller configured to cause the second wavelength band light to be emitted in each output period and the first wavelength band light to be emitted in the output period in which the fourth wavelength band light is emitted, in a plurality of output periods in a frame.

14 Claims, 10 Drawing Sheets

(51) Int. Cl.
*G02B 26/00* (2006.01)
*G09G 3/34* (2006.01)

(52) U.S. Cl.
CPC ........... *G09G 3/001* (2013.01); *G09G 3/3413* (2013.01); *G09G 2310/0235* (2013.01); *G09G 2320/0626* (2013.01)

(56) References Cited

U.S. PATENT DOCUMENTS

2016/0241820 A1    8/2016   Umamine
2016/0360166 A1   12/2016   Ogawa

FOREIGN PATENT DOCUMENTS

| | | |
|---|---|---|
| JP | 2016-148745 A | 8/2016 |
| JP | 2017-3643 A | 1/2017 |

OTHER PUBLICATIONS

IPO; Application No. 201814047916; First Examination Report dated Jan. 27, 2020.

\* cited by examiner

LIGHT SOURCE UNIT AND PROJECTION APPARATUS

CROSS-REFERENCE TO RELATED APPLICATION

This application is based upon and claims the benefit of priority under 35 USC 119 from Japanese Patent Application No. 2018-000937, filed on Jan. 9, 2018, the entire disclosure of which, including the description, claims, drawings and abstract, is incorporated herein by reference.

BACKGROUND OF THE INVENTION

Field of the Invention

The present invention relates to a light source unit and a projection apparatus including the same.

Description of the Related Art

In recent years, data projectors are widely used as image projection apparatuses for projecting screens of personal computers, video screens, or images based on image data stored in memory cards and the like onto a screen. The projector collects light emitted from a light source on a micromirror display element or a liquid crystal plate called DMD (digital micromirror device), and displays a color image on the screen.

For example, Japanese Patent Publication No. 2017-003643 discloses a projection apparatus including a light source, a luminescent wheel, a color wheel, and a control unit. The luminescent wheel has a plurality of light source segments that receive light emitted from the light source and emit light of different wavelength bands. The color wheel has a first transmissive region that transmits light of a predetermined wavelength band and a second transmissive region, and is irradiated with light of different wavelength bands from the luminescent wheel. In addition, the control unit controls the luminescent wheel and the color wheel so that the luminescent wheel and the color wheel are synchronized, and controls the light source so that the emitted light is sequentially irradiated to the plurality of light source segments.

However, in the projection apparatus as disclosed in Japanese Patent Publication No. 2017-003643, since each color is formed by emitted light emitted from one light source or fluorescent light excited by the emitted light, it is assumed that it may be impossible to obtain necessary luminance within a frame rate assumed by a light source unit depending on the color, because of low luminous efficiency or the like.

In view of the foregoing, an object of the present invention is to provide a light source unit and a projection apparatus in which reduction in luminance is reduced.

SUMMARY OF INVENTION

The first aspect of the present invention is summarized as light source unit including: a first light emitting element configured to emit a first wavelength band light; a second light emitting element configured to emit a second wavelength band light; a luminescent wheel configured to have a first fluorescent light emitting region irradiated with the second wavelength band light to emit a third wavelength band light, and a second fluorescent light emitting region that emits a fourth wavelength band light including a wavelength band of the first wavelength band light and the third wavelength band light having a wavelength band adjacent to the first wavelength band light being provided in parallel in a circumferential direction; a color wheel configured to have a second transmissive region that transmits the first wavelength band light to the fourth wavelength band light, and a third transmissive region that transmits only the first wavelength band light or transmits only the first wavelength band light and the second wavelength band light being installed in parallel in the circumferential direction, and synchronously rotate with the luminescent wheel; and a controller configured to cause the second wavelength band light to be emitted in each output period and the first wavelength band light to be emitted in the output period in which the fourth wavelength band light is emitted, in a plurality of output periods in a frame.

DETAILED DESCRIPTION OF THE PREFERRED EMBODIMENT

First Embodiment

Figure 1:
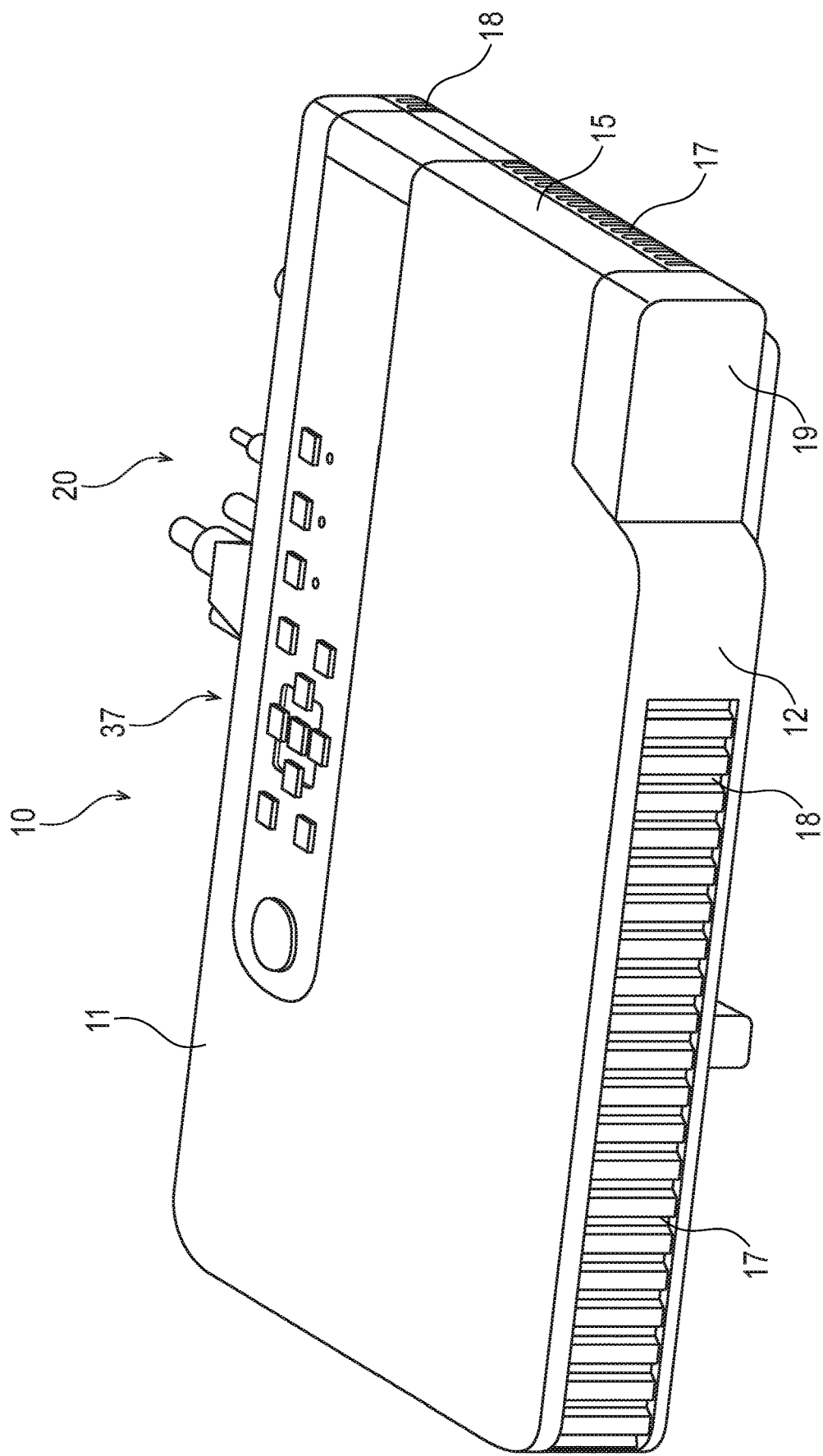
FIG. 1 is an external perspective view showing a projection apparatus according to an embodiment of the present invention.

Embodiments of the present invention will hereinafter be described. FIG. 1 is an external perspective view of a projection apparatus 10 according to the present embodiment. Furthermore, in the present embodiment, the left and right sides of the projection apparatus 10 refer to the left and right directions with respect to a projection direction, and the front side and the back side refer to a screen side direction with respect to the projection apparatus 10 as a front and the opposite side as a rear side.

As shown in FIG. 1, the projection apparatus 10 has a substantially rectangular parallelepiped shape. The projection apparatus 10 has a lens cover 19 covering a projection port on the left side of a front panel 12 which is a side plate in front of a housing. A plurality of intake holes 18 or exhaust holes 17 are provided in the front panel 12. In addition, although not shown, the projection apparatus 10 includes an Ir receiving portion for receiving a control signal from a remote controller.

A key/indicator portion 37 is provided on an upper panel 11 of the housing. On the key/indicator portion 37, a key or an indicator such as a power switch key, a power indicator for notifying turning on or off of a power supply, a projection switch key for switching turning on or off of projection, an overheat indicator for informing when the light source unit 60, the display element 51 or the control circuit or the like is overheated are disposed.

In addition, various terminals 20 such as a USB terminal, an input and output connector portion for providing a D-SUB terminal for inputting an image signal, an S terminal, an RCA terminal, and the like, and a power supply adapter plug are provided on a rear panel of the housing. In addition, a plurality of intake holes are formed in the back panel. Furthermore, a plurality of exhaust holes 17 are formed in each of the right panel which is a side plate of the housing (not shown) and the left panel 15 which is aside plate shown in FIG. 1. In addition, an intake hole 18 is also formed in a corner portion of the left panel 15 near the rear panel.

Figure 2:
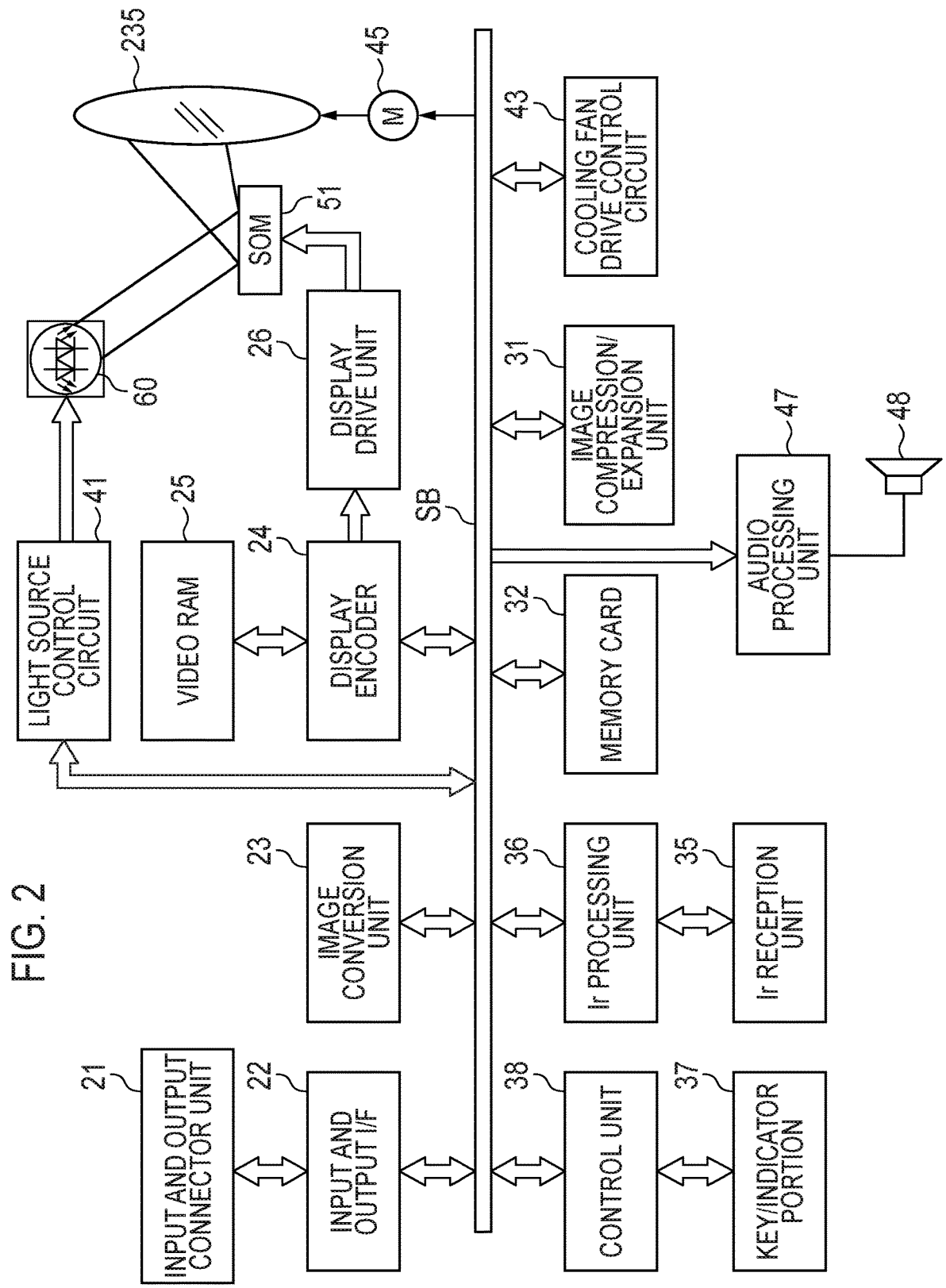
FIG. 2 is a view showing functional circuit blocks of a projection apparatus according to an embodiment of the present invention.

Next, a projection apparatus control unit of the projection apparatus 10 will be described with reference to the functional circuit block diagram of FIG. 2. The projection apparatus control unit includes a control unit 38, an input and output interface 22, an image conversion unit 23, a display encoder 24, a display drive unit 26, and the like. Various standards of image signals input from an input and output connector unit 21 are converted by the image conversion unit 23 into an image signal of a predetermined format suitable for display via the input and output interface 22 and the system bus (SB), and are then output to the display encoder 24.

In addition, the display encoder 24 develops and stores the input image signal in a video RAM 25, generates a video signal from the stored contents of the video RAM 25, and outputs it to the display drive unit 26.

The display drive unit 26 drives a display element 51, which is a spatial optical modulation element (SOM), at an appropriate frame rate according to the image signal output from the display encoder 24. The projection apparatus 10 irradiates a pencil of light rays emitted from the light source unit 60 to the display element 51 through a light guide optical system so as to form an optical image with reflected light of the display element 51, and projects and displays the image on a screen (not shown) through a projection optical system to be described later. Furthermore, a movable lens group 235 of the projection optical system can be driven for zoom adjustment or focus adjustment by a lens motor 45.

In addition, an image compression/expansion unit 31 performs a recording process of performing data compression of a luminance signal and a color difference signal of the image signal by processing such as ADCT and Huffman coding and sequentially writing the luminance signal and the color difference signal in a memory card 32 which is a removable recording medium. In addition, the image compression/expansion unit 31 reads the image data recorded in the memory card 32 during a reproduction mode, expands individual image data constituting a series of moving images in units of one frame, and outputs the image data to the display encoder 24 through the image conversion unit 23. Therefore, the image compression/expansion unit 31 can display a moving image or the like based on the image data stored in the memory card 32.

The control unit 38 governs an operation control of each circuit in the projection apparatus 10, and is constituted by a ROM fixedly storing operating program such as a CPU or various settings, RAM used as a work memory, and the like.

The key/indicator portion 37 is constituted by a main key and an indicator provided on the upper panel 11 of the housing. An operation signal of the key/indicator portion 37 is directly transmitted to the control unit 38. In addition, a key operation signal from the remote controller is received by the Ir reception unit 35, demodulated into a code signal by the Ir processing unit 36, and output to the control unit 38.

An audio processing unit 47 is connected to the control unit 38 through the system bus (SB). The audio processing unit 47 includes a sound source circuit such as a PCM sound source, converts audio data into analog form during the projection mode and the reproduction mode, and drives a speaker 48 to emit loud sound.

The control unit 38 controls a light source control circuit 41. The light source control circuit 41 individually controls an operation of an excitation light irradiation apparatus of the light source unit 60 so that light of a predetermined wavelength band required at the time of image generation is emitted from the light source unit 60. In addition, the light source control circuit 41 controls a synchronization timing of the luminescent wheel and the color wheel according to an output mode of the light source unit 60, by an instruction from the control unit 38.

In addition, the control unit 38 causes a cooling fan drive control circuit 43 to perform a temperature detection by a plurality of temperature sensors provided in the light source unit 60 or the like, and controls a rotation speed of the cooling fan from a result of such a temperature detection. In addition, the control unit 38 performs a control that causes the cooling fan drive control circuit 43 to continue the rotation of the cooling fan even after the power of the main body of the projection apparatus 10 is turned off by a timer or the like or to turn off the power of the main body of the projection apparatus 10 depending on the result of the temperature detection by the temperature sensor.

Figure 3:
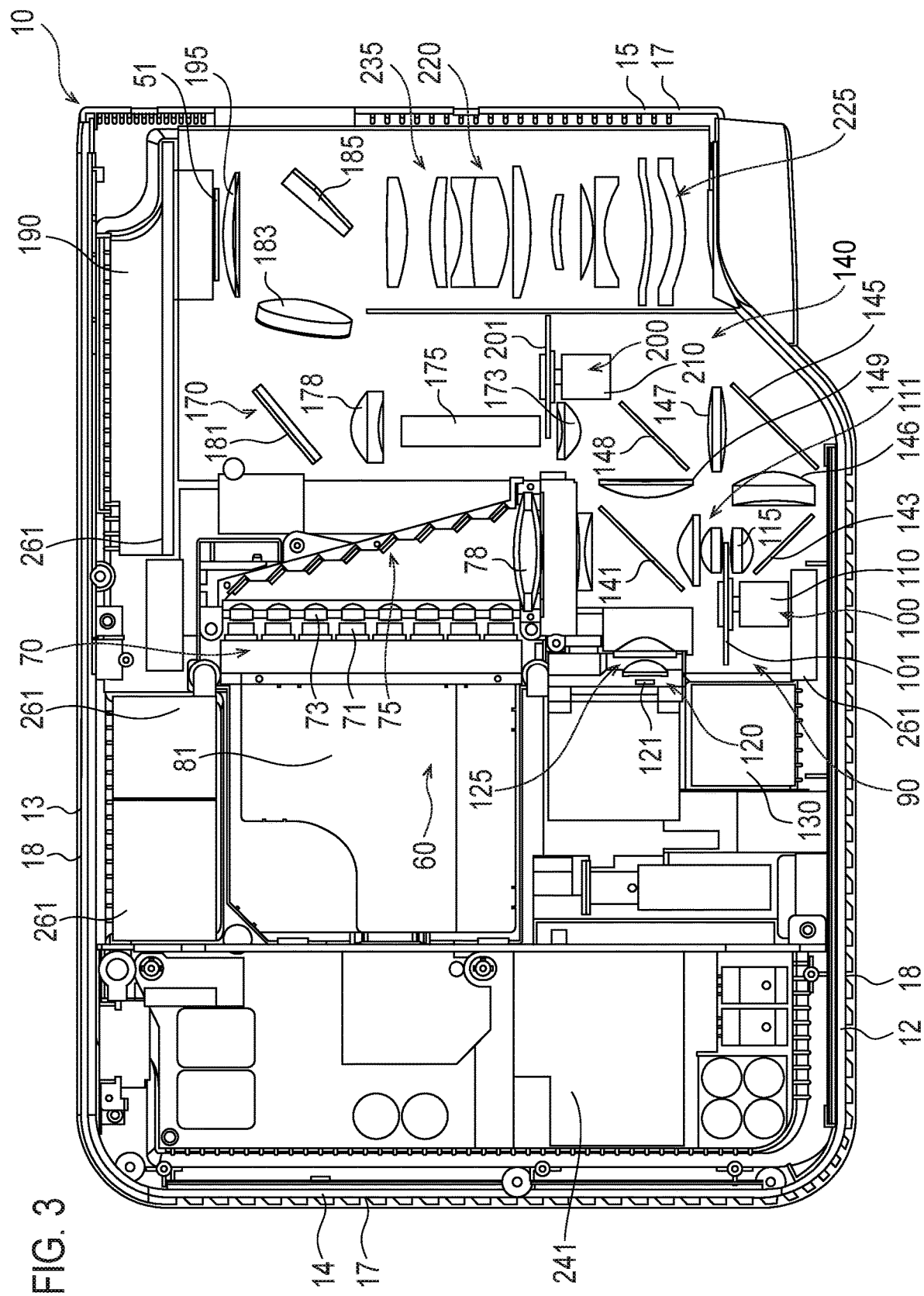
FIG. 3 is a schematic plan view showing an internal structure of the projection apparatus according to the embodiment of the present invention.

FIG. 3 is a schematic plan view showing an internal structure of the projection apparatus 10. The projection apparatus 10 includes a control circuit board 241 in the vicinity of a right side panel 14. The control circuit board 241 includes a power source circuit block, a light source control block, and the like. In addition, the projection apparatus 10 includes the light source unit 60 on a side of the control circuit board 241, that is, at a substantially central portion of the housing of the projection apparatus 10. In addition, the projection apparatus 10 includes a light source optical system 170 or a projection optical system 220 between the light source unit 60 and the left side panel 15.

The light source unit 60 includes an excitation light irradiation apparatus 70 which is a light source of blue wavelength band light (second wavelength band light) and is also an excitation light source, a fluorescent light source unit 90 which is a light source of green wavelength band light (third wavelength band light) and yellow wavelength band light (fourth wavelength band light), a red light source unit 120, which is a light source of red wavelength band light (first wavelength band light), and a color wheel apparatus 200. The fluorescent light source unit 90 is constituted by the excitation light irradiation apparatus 70 and the luminescent wheel apparatus 100.

The light source unit 60 is provided with a light guide optical system 140 that guides light of each color wavelength band and emits the guided light. The light guide optical system 140 guides the light emitted from each light source unit to the light source optical system 170.

The excitation light irradiation apparatus 70 is disposed at the substantially central portion in the left and right direction of the housing of the projection apparatus 10 and in the vicinity of the rear panel 13. The excitation light irradiation apparatus 70 includes a light source group including a plurality of blue laser diodes 71, a reflection mirror group 75, a condensing lens 78, and a heat sink 81. The blue laser diode 71 (second light emitting element) is a semiconductor light emitting element and is disposed so that an optical axis is parallel to the rear panel 13. The reflection mirror group 75 converts the optical axis of the emitted light from each blue laser diode 71 by 90 degrees in a direction of the front panel 12. The condensing lens 78 collects the emitted light from each blue laser diode 71 reflected by the reflection mirror group 75. The heat sink 81 is disposed between the blue laser diode 71 and the right side panel 14.

The light source group is formed by arranging the plurality of blue laser diodes 71 in a matrix. In addition, on the optical axis of each blue laser diode 71, a plurality of collimator lenses 73 for converting the emitted light into parallel light are disposed so as to increase directivity of the emitted light from each blue laser diode 71. A plurality of reflection mirror groups 75 are positioned in a stepwise manner and are integrated with a mirror base. The reflection mirror group 75 reduces a pencil of light rays emitted from the blue laser diode 71 in one direction and emits the pencil of light rays to the condensing lens 78.

A cooling fan 261 is disposed between the heat sink 81 and the rear panel 13. The blue laser diode 71 is cooled by the cooling fan 261 and the heat sink 81. In addition, the cooling fan 261 is also disposed between the reflection mirror group 75 and the rear panel 13. The reflection mirror group 75 and the condensing lens 78 are cooled by the cooling fan 261.

The luminescent wheel apparatus 100 is disposed on an optical path of the excitation light emitted from the excitation light irradiation apparatus 70 and in the vicinity of the front panel 12. The luminescent wheel apparatus 100 includes a luminescent wheel 101, a motor 110, a condensing lens group 111, and a condensing lens 115. The luminescent wheel 101 is disposed so as to be parallel to the front panel 12, that is, so as to be orthogonal to the optical axis of the emitted light from the excitation light irradiation apparatus 70. The motor 110 rotationally drives the luminescent wheel 101. The condensing lens group 111 collects a pencil of light rays of the excitation light emitted from the excitation light irradiation apparatus 70 on the luminescent wheel 101 and collects the pencil of light rays emitted from the luminescent wheel 101 in the direction of the rear panel 13. The condensing lens 115 collects a pencil of light rays emitted from the luminescent wheel 101 in the direction of the front panel 12. The cooling fan 261 is disposed on the side of the front panel 12 of the motor 110, and the luminescent wheel apparatus 100 and the like are cooled by the cooling fan 261.

The red light source unit 120 is provided with a red light source 121 disposed so that an optical axis thereof is parallel to the blue laser diode 71 and a condensing lens group 125 for collecting emitted light from the red light source 121. The red light source 121 (first light emitting element) is a light emitting diode which is a semiconductor light emitting element which emits red wavelength band light. In addition, the red light source unit 120 is disposed so that an optical axis of the red wavelength band light emitted from the red light source unit 120 crosses an optical axis of the green wavelength band light emitted from the luminescent wheel 101. In addition, the red light source unit 120 includes the heat sink 130 on the right panel 14 side of the red light source 121. A cooling fan (not shown) is disposed between the heat sink 130 and the front panel 12. The red light source 121 is cooled by the cooling fan and the heat sink 130.

The light guide optical system 140 includes condensing lenses 146, 147, and 149 for collecting the pencil of light rays, reflection mirrors for converting the optical axis of each pencil of light rays into the same optical axis (a first reflection mirror 143 and a second reflection mirror 145), dichroic mirrors (a first dichroic mirror 141 and a second dichroic mirror 148), and the like. Each member will hereinafter be described.

The first dichroic mirror 141 is disposed at a position between the condensing lens 78 and the condensing lens group 111. The first dichroic mirror 141 transmits the blue wavelength band light and the red wavelength band light, reflects the yellow wavelength band light and the green wavelength band light, and converts the optical axis thereof by 90 degrees in the direction of the condensing lens 149. The red wavelength band light emitted from the red light source 121 which is a light emitting diode is in a long wavelength band as compared with the red wavelength band light emitted by a red phosphor. Therefore, although the yellow wavelength band light includes the green wavelength band light and the red wavelength band light, it is easy for the first dichroic mirror 141 to transmit the red wavelength band light on the long wavelength side and to reflect the yellow wavelength band light.

The first reflection mirror 143 is disposed on the optical axis of the blue wavelength band light that has transmitted through or diffusely transmitted through the luminescent wheel 101, that is, between the condensing lens 115 and the front panel 12. The first reflection mirror 143 reflects the blue wavelength band light and converts the optical axis of the blue wavelength band light by 90 degrees in the direction of the left side panel 15. The condensing lens 146 is disposed on the left side panel 15 side of the first reflection mirror 143. The second reflection mirror 145 is disposed on the left side panel 15 side of the condensing lens 146. The condensing lens 147 is disposed on the rear panel 13 side of the second reflection mirror 145. The second reflection mirror 145 converts the optical axis of the blue wavelength band light reflected by the first reflection mirror 143 and collected by the condensing lens 146 by 90 degrees toward the condensing lens 147 of the rear panel 13 side.

The condensing lens 149 is disposed on the left side panel 15 side of the first dichroic mirror 141. The second dichroic mirror 148 is disposed on the left panel 15 side of the condensing lens 149 and on the rear panel 13 side of the condensing lens 147. The second dichroic mirror 148 reflects the red wavelength band light, the yellow wavelength band light, and the green wavelength band light, and converts the optical axes thereof by 90 degrees toward the rear panel 13. In addition, the second dichroic mirror 148 transmits the blue wavelength band light. For this reason, the blue wavelength band light collected by the condensing lens 147 transmits through the second dichroic mirror 148 and is incident on a condensing lens 173.

The green wavelength band light, the red wavelength band light, and the yellow wavelength band light reflected or transmitted by the first dichroic mirror 141 are incident on the condensing lens 149. In addition, the green wavelength band light, the red wavelength band light, and the yellow wavelength band light collected by the condensing lens 149 are reflected by the second dichroic mirror 148 are incident on the condensing lens 173 of the light source optical system 170.

The light source optical system 170 includes the condensing lens 173, a light tunnel 175, a condensing lens 178, an optical axis conversion mirror 181, a condensing lens 183, an irradiation mirror 185, and a condenser lens 195. Further, since the condenser lens 195 emits the image light emitted from the display element 51 disposed on the rear panel 13 side of the condenser lens 195 toward the projection optical system 220, it is also a portion of the projection optical system 220.

The condensing lens 173 is disposed on the side of the second dichroic mirror 148 with respect to the light tunnel 175. The condensing lens 173 collects light source light from the second dichroic mirror 148. Each color wavelength band light collected by the condensing lens 173 is emitted toward a color wheel 201 of the color wheel apparatus 200.

The color wheel apparatus 200 includes the color wheel 201 and a motor 210 for rotationally driving the color wheel 201. The color wheel apparatus 200 is disposed between the condensing lens 173 and the light tunnel 175 so that the color wheel 201 thereof is orthogonal to the optical axis of the pencil of light rays emitted from the condensing lens 173. The pencil of light rays of the light incident on the color wheel 201 transmits through an all-color transmissive region 410 or a red transmissive region 420 (described later in FIG. 4B) provided in the color wheel 201, whereby a component in a predetermined wavelength band is transmitted and is emitted toward the light tunnel 175. The pencil of light rays incident on the light tunnel 175 becomes a pencil of light rays having a uniform intensity distribution in the light tunnel 175.

The condensing lens 178 is disposed on the optical axis on the side of the rear panel 13 of the light tunnel 175. The optical axis conversion mirror 181 is further disposed on the side of the rear panel 13 of the condensing lens 178. The pencil of light rays emitted from an exiting port of the light tunnel 175 is collected by the condensing lens 178 and is then reflected toward the left panel 15 by the optical axis conversion mirror 181.

The pencil of light rays reflected by the optical axis conversion mirror 181 is collected by the condensing lens 183 and is then irradiated to the display element 51 at a predetermined angle by the irradiation mirror 185 through the condenser lens 195. A heat sink 190 is provided on the rear panel 13 side of the display element 51 which is a DMD. The display element 51 is cooled by the heat sink 190.

The light source light irradiated to an image forming surface of the display element 51 by the light source optical system 170 is reflected by the image forming surface of the display element 51 and is projected as projection light onto the screen through the projection optical system 220. Here, the projection optical system 220 includes the condenser lens 195, a movable lens group 235, and a fixed lens group 225. The movable lens group 235 is formed to be movable by the lens motor 45. In addition, the movable lens group 235 and the fixed lens group 225 are incorporated in a fixed lens barrel. For this reason, the fixed lens barrel including the movable lens group 235 is a variable focus lens and is formed so as to be capable of zoom adjustment or focus adjustment.

By configuring the projection apparatus 10 in this manner, when the luminescent wheel 101 and the color wheel 201 are synchronously rotated and the light is emitted from the excitation light irradiation apparatus 70 and the red light source unit 120 at an arbitrary timing, the respective wavelength band lights of green, blue, red, and yellow are incident on the condensing lens 173 through the light guide optical system 140 and are incident on the display element 51 through the light source optical system 170. For this reason, the DMD, which is the display element 51 of the projection apparatus 10, displays the light of each color in a time division manner according to the data, so that the color image can be projected on the screen.

Figure 4A:
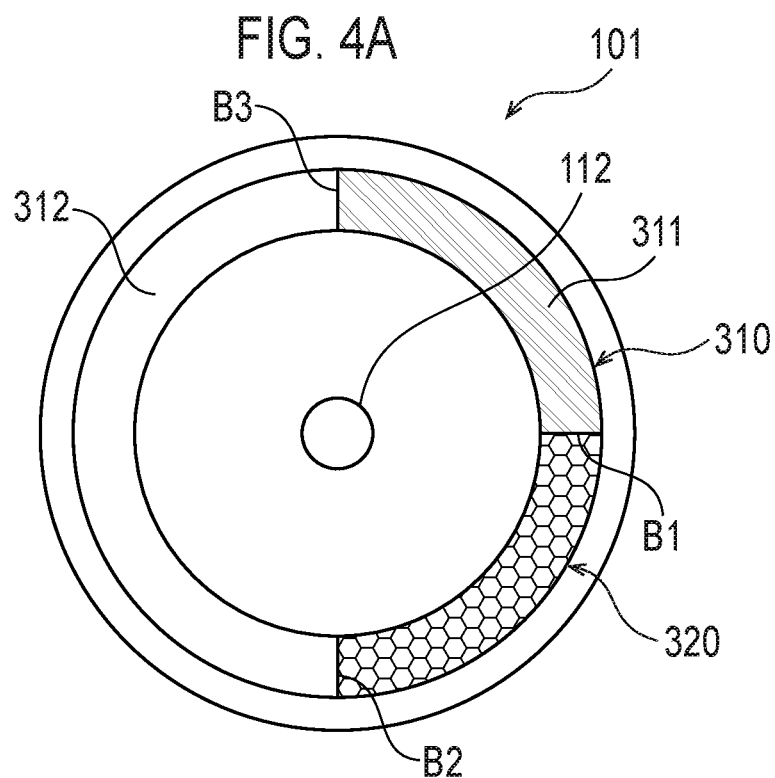
FIG. 4A is a schematic plan view of a luminescent wheel according to an embodiment of the present invention.

FIG. 4A is a schematic plan view of the luminescent wheel 101. The luminescent wheel 101 is formed in a disc shape and has a mounting hole portion 112 in the center thereof. The mounting hole portion 112 is fixed to a shaft portion of the motor 110. As the motor 110 rotates, the luminescent wheel 101 can rotate about the shaft thereof.

The luminescent wheel 101 has a fluorescent light emitting region 310 and a transmissive region (first transmissive region) 320 continuously in a ring shape. A base material of the luminescent wheel 101 is a metal base material made of copper, aluminum, or the like. A surface of the base material on the side of the excitation light irradiation apparatus 70 is mirror-processed by silver evaporation or the like. The fluorescent light emitting region 310 is formed on such a mirror-processed surface. The fluorescent light emitting region 310 has a green phosphor layer (first fluorescent light emitting region) 311 and a yellow phosphor layer (second fluorescent light emitting region) 312. The respective phosphor layers 311 and 312 are provided in parallel in a circumferential direction while having a third boundary B3 interposed therebetween. The green phosphor layer 311 and the yellow phosphor layer 312 receive the blue wavelength band light from the excitation light irradiation apparatus 70 as excitation light and emit fluorescent lights in the green wavelength band and the yellow wavelength band in all directions from the respective regions. The fluorescent light is emitted from the projection apparatus 10 to the rear panel 13, and is incident on the condensing lens group 111.

The transmissive region 320 is formed between the yellow phosphor layer 312 and the green phosphor layer 311 while having boundaries B1 and B2 interposed therebetween. In the transmissive region 320, a transparent base material having translucency is fitted into a cut-out light-transmitting portion of the base material. The transparent base material is formed of a transparent material such as glass or resin. In addition, the transparent base material may be provided with a diffusion layer on a side irradiated with the blue wavelength band light or on the opposite side thereof. The diffusion layer is provided, for example, by forming fine unevenness by sand blasting or the like on the surface of the transparent base material. The blue wavelength band light from the excitation light irradiation apparatus 70 incident on the transmissive region 320 is transmitted or diffused and transmitted in the transmissive region 320, and is incident on the condensing lens 115 shown in FIG. 3.

Figure 4B:
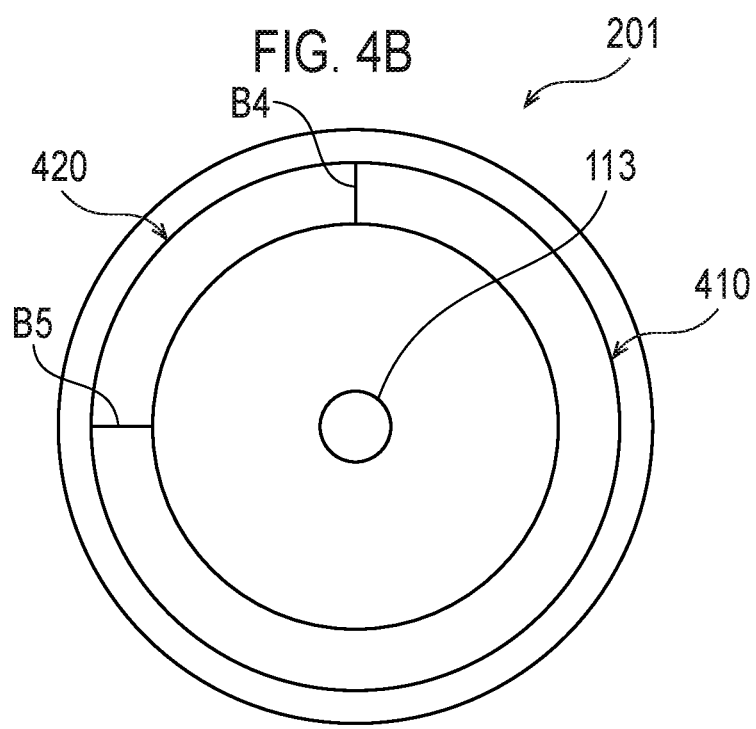
FIG. 4B is a schematic plan view of a color wheel according to an embodiment of the present invention.

FIG. 4B is a schematic view of the color wheel 201 when viewed from the front. The color wheel 201 is formed in a disc shape and has a mounting hole portion 113 in the center thereof. The mounting hole portion 113 is fixed to a shaft portion of the motor 210. As the motor 210 rotates, the color wheel 201 rotates about the shaft thereof.

The color wheel 201 has an all-color transmissive region (second transmissive region) 410 capable of transmitting light including the green wavelength band light, the blue wavelength band light, the red wavelength band light, and the yellow wavelength band light, and a red transmissive region (third transmissive region) 420 capable of transmitting the red wavelength band light, at the position irradiated with each color wavelength band light collected by the condenser lens 173 shown in FIG. 3. The all-color transmissive region 410 and the red transmissive region 420 are continuously provided in parallel in the circumferential direction in a ring shape. The all-color transmissive region 410 and the red transmissive region 420 are formed to be provided in parallel in the circumferential direction while having boundaries B4 and B5 interposed therebetween. The red transmissive region 420 is a region that transmits the red wavelength band light and blocks the green wavelength band light and the blue wavelength band light. Further, the red transmissive region 420 may be configured to transmit the red wavelength band light and transmit light other than a visible light wavelength band.

Further, the luminescent wheel 101 according to the present embodiment forms the green phosphor layer 311 and the transmissive region 320 in an angle range of approximately 90 degrees and forms the yellow phosphor layer 312 in the remaining angle range of approximately 180 degrees. In addition, the color wheel 201 forms the all-color transmissive region 410 in an angle range of approximately 270 degrees and forms the red transmissive region 420 in the remaining angle range of approximately 90 degrees.

Figure 5:
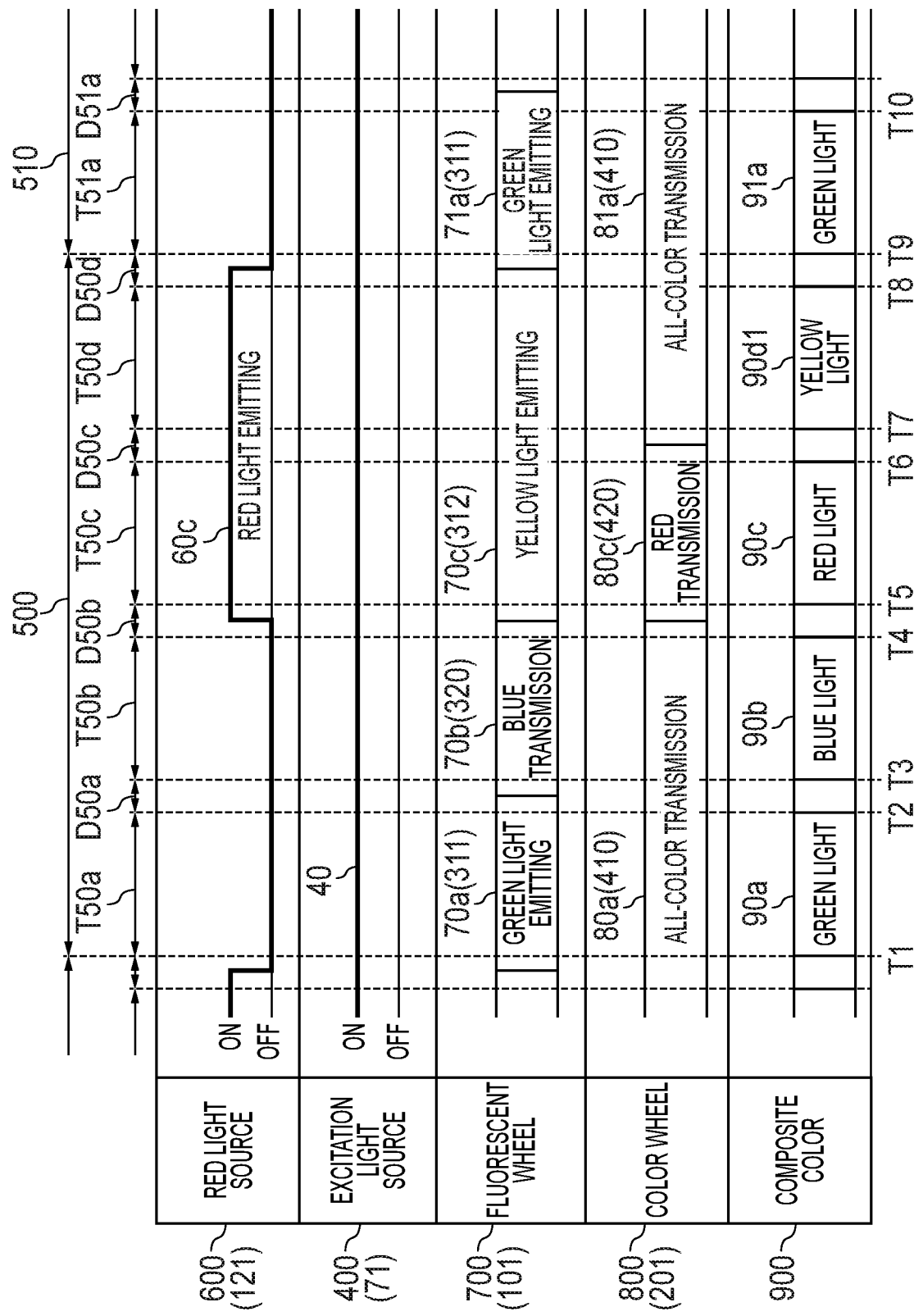
FIG. 5 is a timing chart of a light source unit according to a first embodiment of the present invention.

FIG. 5 is a timing chart of the light source unit 60. In the present embodiment, a projected image formed by light source light of four colors from the projection apparatus 10 is projected on the screen. The light source unit 60 forms one image for each frame 500 and continuously projects the image in a time division manner over a plurality of frames 500. The light source unit 60 time-divides the frame 500 in the order of a first output period T50a, a second output period T50b, a third output period T50c, and a fourth output period T50d to emit light of a pre-allocated color in each output period.

In order to perform the switching of the emitted light, mixed color periods D50a to D50d occur at boundaries between the respective output periods T50a to T50d. The periods during which the blue wavelength band light from the blue laser diode 71 is irradiated to the first boundary B1, the second boundary B2 and the third boundary B3 on the luminescent wheel 101 shown in FIG. 4A are a first mixed color period D50a, a second mixed color period D50b, and a fourth mixed color period D50d, respectively. In addition, the periods during which the light from the luminescent wheel 101 is irradiated on the fourth boundary B4 and the fifth boundary B5 on the color wheel 201 shown in FIG. 4B are the second mixed color period D50b and the third mixed color period D50c. The light source control circuit 41 controls the display element 51 so as not to emit the light source light from the light source unit 60 to the projection optical system 220 in the mixed color periods D50a to D50d.

The red light source 121 puts out the red wavelength band light in the first output period T50a and the second output period T50b and emits the red wavelength band light in the third output period T50c and the fourth output period T50d. The excitation light irradiation apparatus 70 outputs the blue wavelength band light in the respective periods from the first output period T50a to the fourth output period T50d. Further, FIG. 5 shows a case in which the excitation light irradiation apparatus 70 always emits the blue wavelength band light. Each of the output periods T50a to T50d will hereinafter be described.

In the first output period T50a starting from timing T1, the red light source 600 puts out the red wavelength band light. In addition, since the green phosphor layer 311 is irradiated with the blue wavelength band light, a luminescent wheel 700 emits green wavelength band light 70a. The green wavelength band light 70a emitted from the luminescent wheel 700 is irradiated to an all-color transmissive region 80a of a color wheel 800. For this reason, the color wheel 800 transmits the green wavelength band light 70a emitted from the luminescent wheel 700. Therefore, the light source unit 60 emits green wavelength band light 90a as a composite color 900 in the first output period T50a.

In the second output period T50b starting from timing T3, the red light source 600 puts out the red wavelength band light. In addition, since the transmissive region 320 is irradiated with the blue wavelength band light, the luminescent wheel 700 emits blue wavelength band light 70b. The blue wavelength band light 70b emitted from the luminescent wheel 700 is irradiated to an all-color transmissive region 80a. For this reason, the color wheel 800 transmits the blue wavelength band light 70b emitted from the luminescent wheel 700. Therefore, the light source unit 60 emits blue wavelength band light 90b as a composite color 900 in the second output period T50b.

In the third output period T50c starting from timing T5, the red light source 600 emits red wavelength band light 60c. The red wavelength band light 60c is irradiated to a red transmissive region 80c of the color wheel 800. For this reason, the color wheel 800 transmits the red wavelength band light 60c emitted from the red light source 600. In addition, since the yellow phosphor layer 312 is irradiated with the blue wavelength band light, the luminescent wheel 700 emits yellow wavelength band light 70c. The yellow wavelength band light 70c emitted from the luminescent wheel 700 is irradiated to the red transmissive region 80c. For this reason, the color wheel 800 blocks the component of the green wavelength band light from the yellow wavelength band light 70c emitted from the luminescent wheel 700, thereby emitting the red wavelength band light. Therefore, the light source unit 60 emits red wavelength band light 90c as a composite color 900 in the third output period T50c.

In the fourth output period T50d starting from timing T7, the red light source 600 emits the red wavelength band light 60c. The red wavelength band light 60c is irradiated to the all-color transmissive region 80a of the color wheel 800. For this reason, the color wheel 800 transmits the red wavelength band light 60c emitted from the red light source 600. In addition, since the yellow phosphor layer 312 is irradiated with the blue wavelength band light, the luminescent wheel 700 emits yellow wavelength band light 70c. The blue wavelength band light 70c emitted from the luminescent wheel 700 is irradiated to an all-color transmissive region 81a. For this reason, the color wheel 800 transmits the yellow wavelength band light 70c emitted from the luminescent wheel 700. Therefore, the light source unit 60 emits yellow wavelength band light 90d tinged with red as a composite color 900 in the fourth output period T50d.

When the fourth output period T50d elapses, after the fourth mixed color period D50d has elapsed, a first output period T51a of the next frame 510 starts. In the first output period T51a, similarly to the above-described first output period T50a, the source unit 60 controls the luminescent wheel 700 and the color wheel 800 to emit green wavelength band light 91a as a composite color 900. Thereafter, the same operation is repeated.

As described above, according to the present embodiment, the light source unit 60 uses and synthesizes the light emitted from the red light source 121 and the yellow phosphor layer 312 as the light source of the red wavelength band light. For this reason, higher luminance can be secured than in the case in which the light source of the red wavelength band light is a red phosphor layer or a red light emitting diode alone. In addition, since the yellow wavelength band light is used in addition to the green wavelength band light, the blue wavelength band light, and the red wavelength band light as the light source, it is possible to project an entirely bright projected image on the screen or the like.

Second Embodiment

Figure 6:
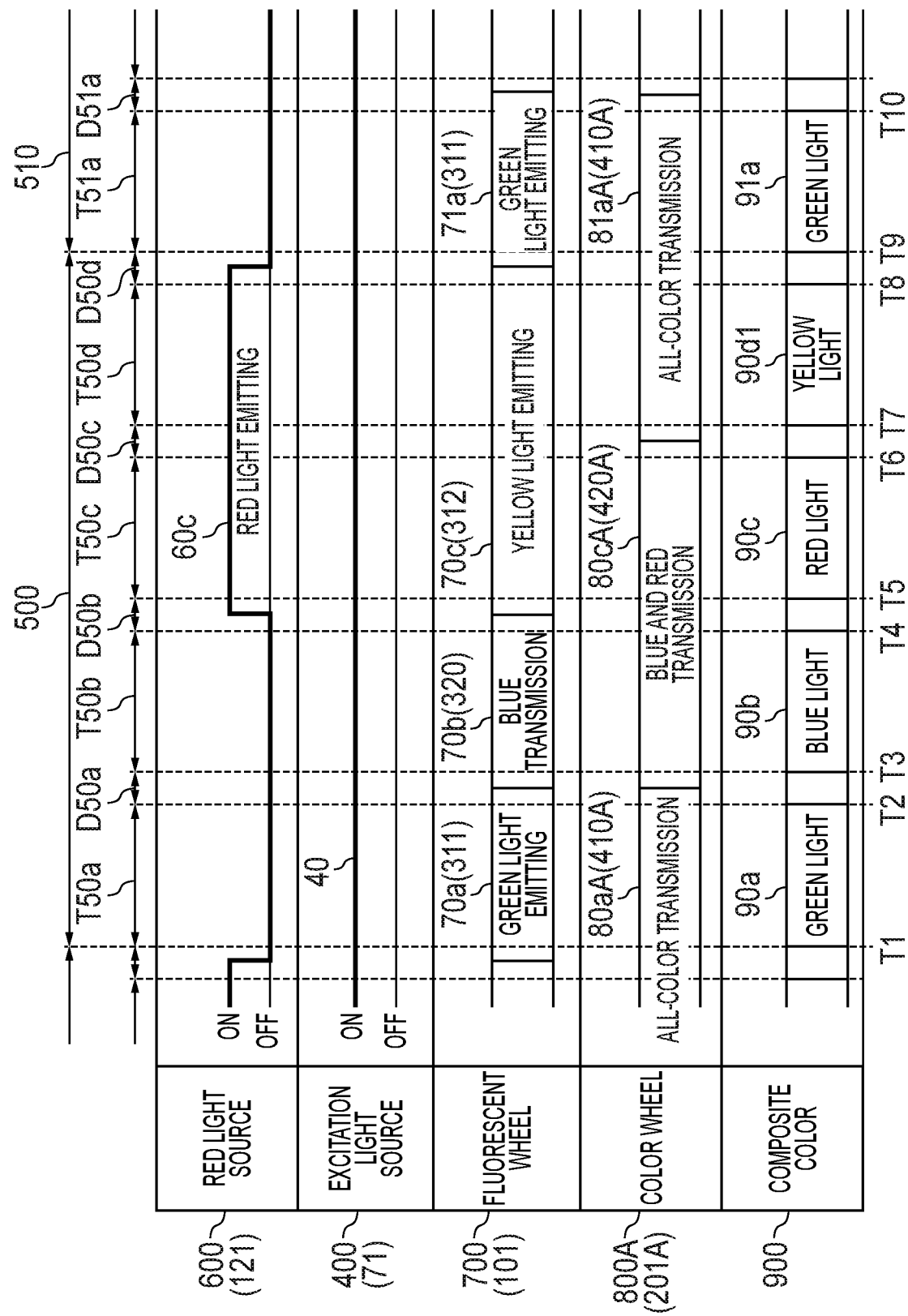
FIG. 6 is a timing chart of a first output mode of a light source unit according to a second embodiment of the present invention.

Next, a second embodiment will be described. FIG. 6 is a timing chart of a first output mode of a light source unit 60 according to the present embodiment. In the present embodiment, a blue and red transmissive region 420 A is disposed instead of the red transmissive region 420 of the color wheel 201 shown in FIG. 4B. In addition, instead of the all-color transmissive region 410 of the color wheel 201 in FIG. 4B, an all-color transmissive region 410A in which a length in a circumferential direction is changed is disposed. In the present embodiment, the lengths of the all-color transmissive region 410A and the blue and red transmissive region 420A in the circumferential direction are the same in an angle range of approximately 180 degrees.

In addition, in the projection apparatus 10 of the second embodiment, it is possible to switch between a first output mode for displaying the projection image with an emphasis on brightness and a second output mode for displaying the projection image with an emphasis on color reproducibility. First, the first output mode will be described with reference to FIG. 6.

In the first output period T50a starting from timing T1, the red light source 600 puts out the red wavelength band light. In addition, since the green phosphor layer 311 is irradiated with the blue wavelength band light, a luminescent wheel 700 emits green wavelength band light 70a. The green wavelength band light 70a emitted from the luminescent wheel 700 is irradiated to an all-color transmissive region 80aA. For this reason, a color wheel 800A transmits the green wavelength band light 70a emitted from the luminescent wheel 700. Therefore, the light source unit 60 emits green wavelength band light 90a as the composite color 900 in the first output period T50a.

In the second output period T50b starting from timing T3, the red light source 600 puts out the red wavelength band light. In addition, since the transmissive region 320 is irradiated with the blue wavelength band light, the luminescent wheel 700 emits blue wavelength band light 70b. The blue wavelength band light 70b emitted from the luminescent wheel 700 is irradiated to a blue and red transmissive region 80cA. For this reason, the color wheel 800A transmits the blue wavelength band light 70b emitted from the luminescent wheel 700. Therefore, the light source unit 60 emits blue wavelength band light 90b as the composite color 900 in the second output period T50b.

In the third output period T50c starting from timing T5, the red light source 600 turns off red wavelength band light 60c. The red wavelength band light 60c is irradiated to the blue and red transmissive region 80cA. For this reason, the color wheel 800A transmits the red wavelength band light 60c emitted from the red light source 600. In addition, since the yellow phosphor layer 312 is irradiated with the blue wavelength band light, the luminescent wheel 700 emits yellow wavelength band light 70c. The yellow wavelength band light 70c emitted from the luminescent wheel 700 is irradiated to the blue and red transmissive region 80cA. For this reason, the color wheel 800A blocks the component of the green wavelength band light from the yellow wavelength band light 70c emitted from the luminescent wheel 700, thereby emitting the red wavelength band light. Therefore, the light source unit 60 emits red wavelength band light 90c as the composite color 900 in the third output period T50c.

In the fourth output period T50d starting from timing T7, the red light source 600 emits the red wavelength band light 60c. The red wavelength band light 60c is irradiated to an all-color transmissive region 81aA. For this reason, the color wheel 800A transmits the red wavelength band light 60c emitted from the red light source 600. In addition, the yellow phosphor layer 312 is irradiated with the blue wavelength band light, and the luminescent wheel 700 emits yellow wavelength band light 70c. The yellow wavelength band light 70c emitted from the luminescent wheel 700 is irradiated to the all-color transmissive region 81aA of the color wheel 800A. For this reason, the color wheel 800A transmits the yellow wavelength band light 70c emitted from the luminescent wheel 700. Therefore, the light source unit 60 emits yellow wavelength band light 90d tinged with red as the composite color 900 in the fourth output period T50d.

When the fourth output period T50d elapses, after the fourth mixed color period D50d has elapsed, a first output period T51a of the next frame 510 starts. In the first output period T51a, similarly to the above-described first output period T50a, the light source unit 60 controls the luminescent wheel 700 and the color wheel 800A to emit green wavelength band light 91a as the composite color 900. Thereafter, the same operation is repeated.

Figure 7:
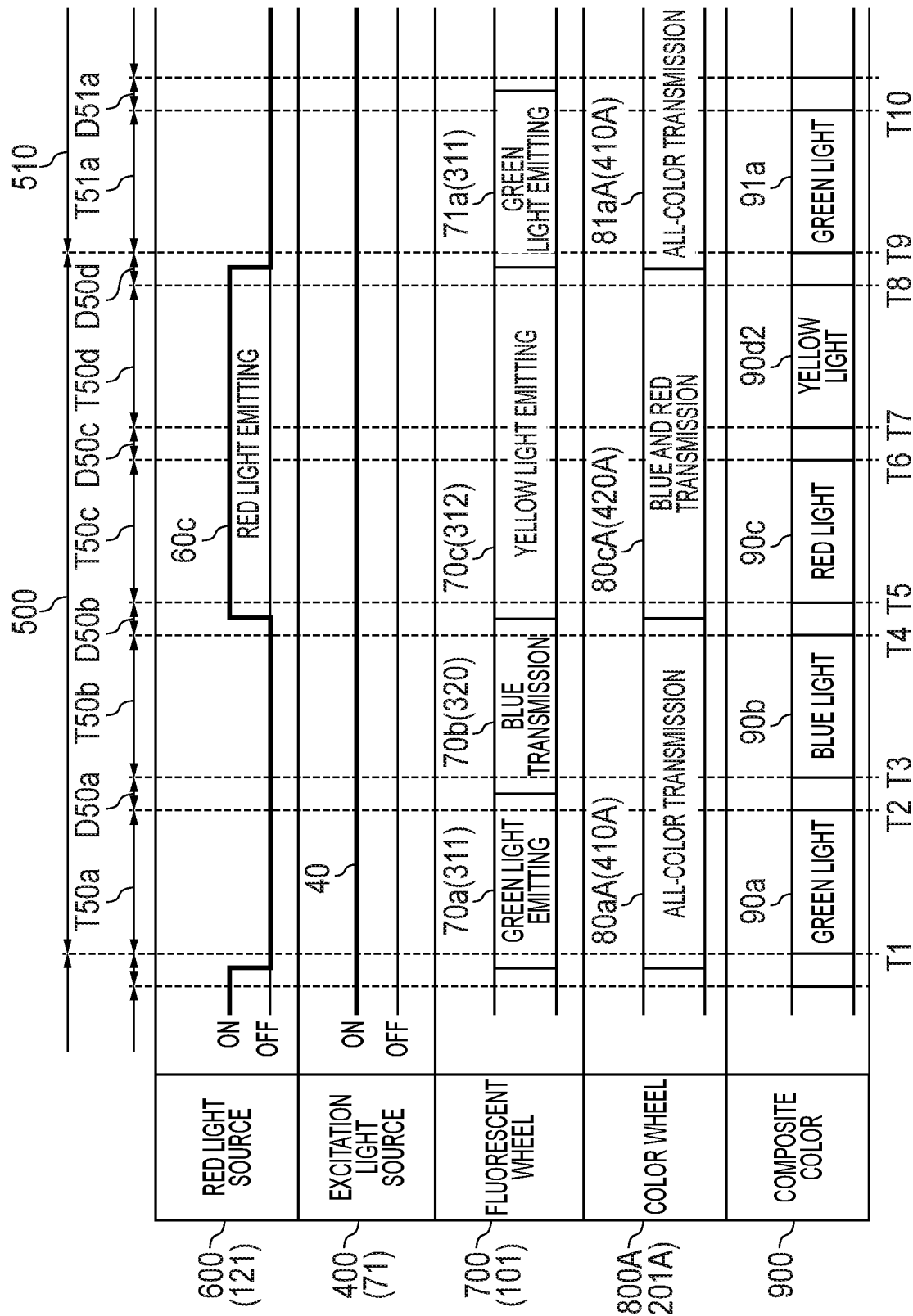
FIG. 7 is a timing chart of a second output mode of the light source unit according to the second embodiment of the present invention.

FIG. 7 is a timing chart of a second output mode of a light source unit 60 according to the second embodiment. In the second mode, the light source control circuit 41 controls a synchronization position of the color wheel 201A with respect to the luminescent wheel 101 to be shifted as compared with the first mode.

In the first output period T50a starting from timing T1, the red light source 600 puts out the red wavelength band light. In addition, since the green phosphor layer 311 is irradiated with the blue wavelength band light, a luminescent wheel 700 emits green wavelength band light 70a. The green wavelength band light 70a emitted from the luminescent wheel 700 is irradiated to the all-color transmissive region 80aA. For this reason, a color wheel 800A transmits the green wavelength band light 70a emitted from the luminescent wheel 700. Therefore, the light source unit 60 emits green wavelength band light 90a as the composite color 900 in the first output period T50a.

In the second output period T50b starting from timing T3, the red light source 600 puts out the red wavelength band light. In addition, since the transmissive region 320 is irradiated with the blue wavelength band light, the luminescent wheel 700 emits the blue wavelength band light 70b. The blue wavelength band light 70b emitted from the luminescent wheel 700 is irradiated to the all-color transmissive region 80aA. For this reason, the color wheel 800A transmits the blue wavelength band light 70b emitted from the luminescent wheel 700. Therefore, the light source unit 60 emits blue wavelength band light 90b as the composite color 900 in the second output period T50b.

In the third output period T50c starting from timing T5, the red light source 600 emits red wavelength band light 60c. The red wavelength band light 60c is irradiated to the blue and red transmissive region 80cA of the color wheel 800A. For this reason, the color wheel 800A transmits the red wavelength band light 60c emitted from the red light source 600. In addition, since the yellow phosphor layer 312 is irradiated with the blue wavelength band light, the luminescent wheel 700 emits yellow wavelength band light 70c. The yellow wavelength band light 70c emitted from the luminescent wheel 700 is irradiated to the blue and red transmissive region 80cA. For this reason, the color wheel 800A blocks the component of the green wavelength band light from the yellow wavelength band light 70c emitted from the luminescent wheel 700, thereby emitting the red wavelength band light. Therefore, the light source unit 60 emits red wavelength band light 90c as the composite color 900 in the third output period T50c.

In the fourth output period T50d starting from timing T7, the red light source 600 emits the red wavelength band light 60c. The red wavelength band light 60c is irradiated to the blue and red transmissive region 80cA of the color wheel 800A. For this reason, the color wheel 800A transmits the red wavelength band light 60c emitted from the red light source 600. In addition, since the yellow phosphor layer 312 is irradiated with the blue wavelength band light, the luminescent wheel 700 emits yellow wavelength band light 70c. The yellow wavelength band light 70c emitted from the luminescent wheel 700 is irradiated to the blue and red transmissive region 80cA. For this reason, the color wheel 800A blocks the component of the green wavelength band light from the yellow wavelength band light 70c emitted from the luminescent wheel 700, thereby emitting the red wavelength band light. Therefore, the light source unit 60 emits red wavelength band light 90d2 as the composite color 900 in the fourth output period T50d.

When the fourth output period T50d elapses, after the fourth mixed color period D50d has elapsed, a first output period T51a of the next frame 510 starts. In the first output period T51a, similarly to the above-described first output period T50a, the light source unit 60 controls the luminescent wheel 700 and the color wheel 800A to emit green wavelength band light 91a as the composite color 900. Thereafter, the same operation is repeated.

As described above, according to the present embodiment, the light source unit 60 uses and synthesizes the light emitted from the red light source 121 and the yellow phosphor layer 312 as the light source of the red wavelength band light. For this reason, luminance can be secured as compared with the case in which the light source of the red wavelength band light is a red phosphor layer or a red light emitting diode alone. In addition, since the yellow wavelength band light is used in addition to the green wavelength band light, the blue wavelength band light, and the red wavelength band light as the light source, it is possible to project an entirely bright projected image on the screen or the like.

In addition, since it is possible to switch the first output mode and the second output mode, a user can freely select an image quality according to a specification environment of the projection apparatus 10. By switching to the second output mode, the light source unit 60 can emit the red wavelength band light, which is relatively difficult to secure luminance, for a long period by using the light emitted from the red light source 121 and the yellow phosphor layer 312, and can improve the reproducibility of color of the projected image.

Third Embodiment

Figure 8:
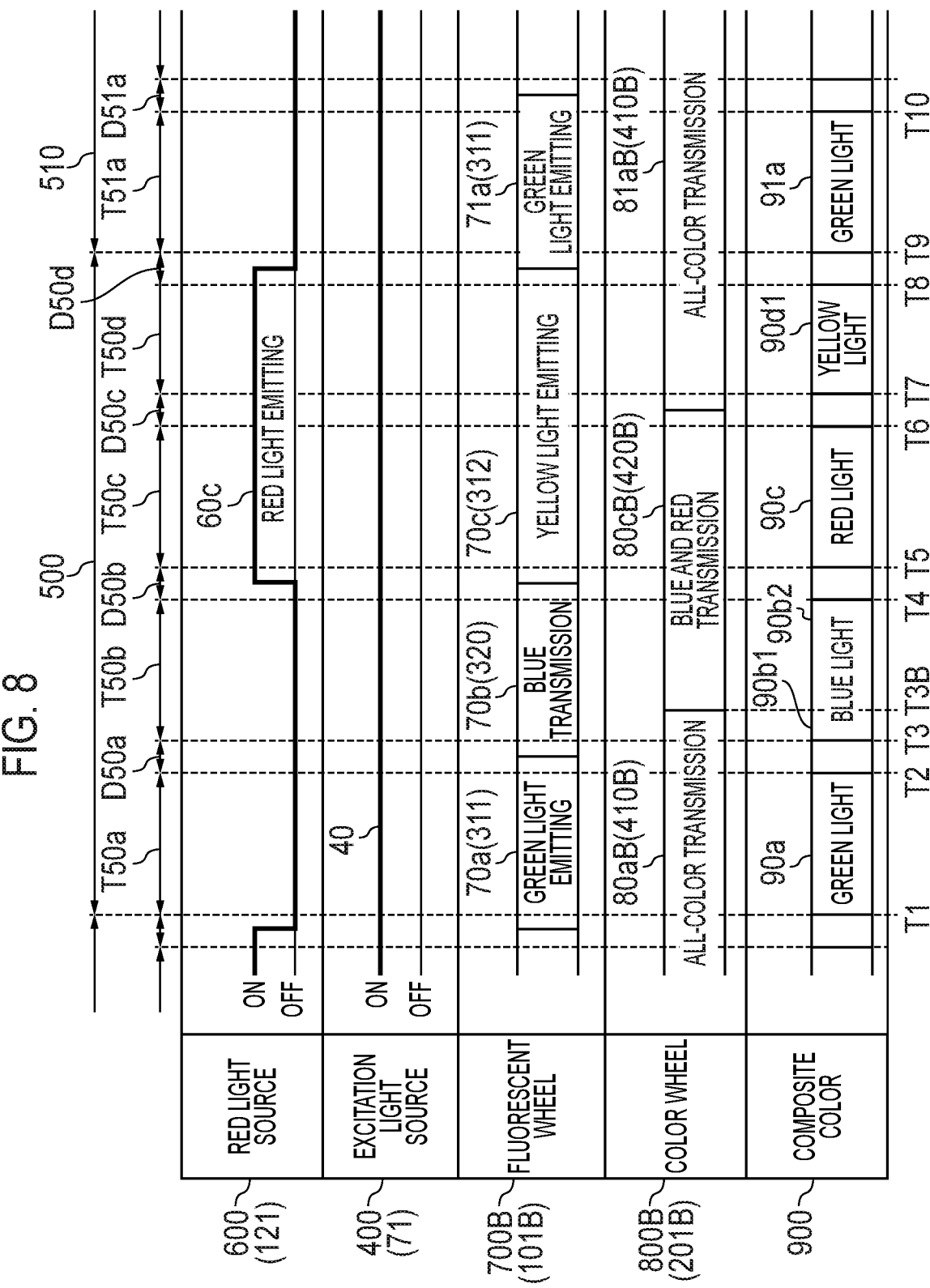
FIG. 8 is a timing chart of a first output mode of a light source unit according to a third embodiment of the present invention.

Next, a third embodiment will be described. FIG. 8 is a timing chart of a first output mode of a light source unit 60 according to the present embodiment. In the present embodiment, instead of the luminescent wheel 101, a luminescent wheel 101B in which lengths of a green phosphor layer 311, a yellow phosphor layer 312, and a transmissive region 320 in the circumferential direction are changed is used.

In addition, in the present embodiment, instead of the color wheel 201, a color wheel 201B including an all-color transmissive region 410B and a blue and red transmissive region 420B in which lengths of the all-color transmissive region 410A and the blue and red transmissive region 420A in the circumferential direction are changed is used. The angle range of the blue and red transmissive region 420B on the color wheel 201B is substantially the same as the angle range of the yellow phosphor layer 312 on the luminescent wheel 101B.

In the first output period T50a starting from timing T1, the red light source 600 puts out the red wavelength band light. In addition, since the green phosphor layer 311 is irradiated with the blue wavelength band light, a luminescent wheel 700 emits the green wavelength band light 70a. The green wavelength band light 70a emitted from the luminescent wheel 700 is irradiated to an all-color transmissive region 80aB. For this reason, a color wheel 800B transmits the green wavelength band light 70a emitted from a luminescent wheel 700B. Therefore, the light source unit 60 emits green wavelength band light 90a as the composite color 900 in the first output period T50a.

In the second output period T50b starting from timing T3, the red light source 600 puts out the red wavelength band light. In addition, since the transmissive region 320 is irradiated with the blue wavelength band light, the luminescent wheel 700B emits the blue wavelength band light 70b. In the second output period T50b, the color wheel 800B is controlled so that the all-color transmissive region 80aB and a blue and red transmissive region 80cB are positioned on an optical path. The blue wavelength band light 70b emitted from the luminescent wheel 700B is sequentially irradiated to the all-color transmissive region 80aB and the blue and red transmissive region 80cB in a time division manner. For this reason, the color wheel 800B transmits the blue wavelength band light 70b emitted from the luminescent wheel 700B. Therefore, the light source unit 60 emits blue wavelength band light 90b as the composite color 900 in the second output period T50b.

In the third output period T50c starting from timing T5, the red light source 600 turns off red wavelength band light 60c. The red wavelength band light 60c is irradiated to the blue and red transmissive region 80cB of the color wheel 800B. For this reason, the color wheel 800B transmits the red wavelength band light 60c emitted from the red light source 600. In addition, since the yellow phosphor layer 312 is irradiated with the blue wavelength band light, the luminescent wheel 700B emits the yellow wavelength band light 70c. The yellow wavelength band light 70c emitted from the luminescent wheel 700B is irradiated to the blue and red transmissive region 80cB of the color wheel 800B. For this reason, the color wheel 800B blocks the component of the green wavelength band light from the yellow wavelength band light 70c emitted from the luminescent wheel 700B, thereby emitting the red wavelength band light. Therefore, the light source unit 60 emits red wavelength band light 90c as the composite color 900 in the third output period T50c.

In the fourth output period T50d starting from timing T7, the red light source 600 emits the red wavelength band light 60c. The red wavelength band light 60c is irradiated to an all-color transmissive region 81aB of the color wheel 800B. For this reason, the color wheel 800B transmits the red wavelength band light 60c emitted from the red light source 600. In addition, since the yellow phosphor layer 312 is irradiated with the blue wavelength band light, the luminescent wheel 700B emits the yellow wavelength band light 70c. The yellow wavelength band light 70c emitted from the luminescent wheel 700B is irradiated to the all-color transmissive region 81aB. For this reason, the color wheel 800B transmits the yellow wavelength band light 70c emitted from the luminescent wheel 700B. Therefore, the light source unit 60 emits yellow wavelength band light 90d1 tinged with red as the composite color 900 in the fourth output period T50d.

When the fourth output period T50d elapses, after the fourth mixed color period D50d has elapsed, a first output period T51a of the next frame 510 starts. In the first output period T51a, similarly to the above-described first output period T50a, the light source unit 60 controls the luminescent wheel 700B and the color wheel 800B to emit green wavelength band light 91a as the composite color 900. Thereafter, the same operation is repeated.

Figure 9:
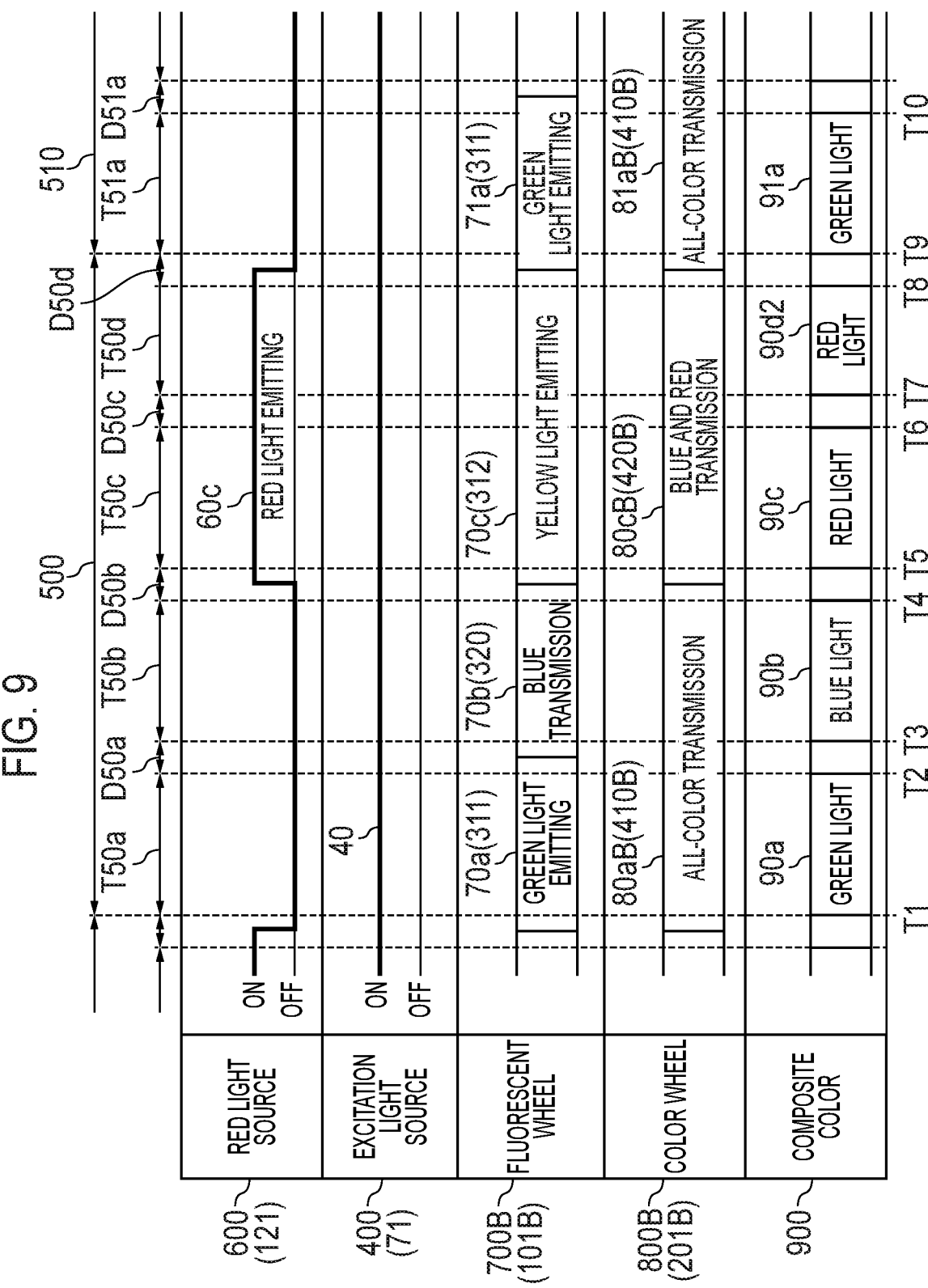
FIG. 9 is a timing chart of a second output mode of the light source unit according to the third embodiment of the present invention.

FIG. 9 is a timing chart of a second output mode of a light source unit 60 according to the third embodiment. In the second mode, the light source control circuit 41 controls a synchronization position of the color wheel 201B with respect to the luminescent wheel 101 to be shifted as compared with the first mode.

In the first output period T50a starting from timing Tl, the red light source 600 puts out the red wavelength band light. Since the green phosphor layer 311 is irradiated with the blue wavelength band light, a luminescent wheel 700B emits the green wavelength band light 70a. The green wavelength band light 70a emitted from the luminescent wheel 700B is irradiated to the all-color transmissive region 80aB. For this reason, the color wheel 800B transmits the green wavelength band light 70a emitted from the luminescent wheel 700B. Therefore, the light source unit 60 emits green wavelength band light 90a as the composite color 900 in the first output period T50a.

In the second output period T50b starting from timing T3, the red light source 600 puts out the red wavelength band light. In addition, since the transmissive region 320 is irradiated with the blue wavelength band light 40, the luminescent wheel 700B emits the green wavelength band light 70a. The blue wavelength band light 70b emitted from the luminescent wheel 700 is irradiated to the all-color transmissive region 80aB. For this reason, the color wheel 800B transmits the blue wavelength band light 70b emitted from the luminescent wheel 700B. Therefore, the light source unit 60 emits blue wavelength band light 90b as the composite color 900 in the second output period T50b.

In the third output period T50c starting from timing T5, the red light source 600 emits red wavelength band light 60c. The red wavelength band light 60c is irradiated to the blue and red transmissive region 80cB of the color wheel 800B. For this reason, the color wheel 800B transmits the red wavelength band light 60c emitted from the red light source 600. In addition, since the yellow phosphor layer 312 is irradiated with the blue wavelength band light 40, the luminescent wheel 700B emits the yellow wavelength band light 70c. The yellow wavelength band light 70c emitted from the luminescent wheel 700B is irradiated to a blue and red transmissive region 80cB. For this reason, the color wheel 800B blocks the component of the green wavelength band light from the yellow wavelength band light 70c emitted from the luminescent wheel 700, thereby emitting the red wavelength band light. Therefore, the light source unit 60 emits red wavelength band light 90c as the composite color 900 in the third output period T50c.

In the fourth output period T50d starting from timing T7, the red light source 600 emits the red wavelength band light 60c. The red wavelength band light 60c is irradiated to the blue and red transmissive region 80cB of the color wheel 800B. For this reason, the color wheel 800B transmits the red wavelength band light 60c emitted from the red light source 600. In addition, since the yellow phosphor layer 312 is irradiated with the blue wavelength band light 40, the luminescent wheel 700B emits the yellow wavelength band light 70c. The yellow wavelength band light 70c emitted from the luminescent wheel 700B is irradiated to a blue and red transmissive region 80cB. For this reason, the color wheel 800B blocks the component of the green wavelength band light from the yellow wavelength band light 70c emitted from the luminescent wheel 700, thereby emitting the red wavelength band light. Therefore, the light source unit 60 emits red wavelength band light 90d2 as the composite color 900 in the fourth output period T50d.

When the fourth output period T50d elapses, after the fourth mixed color period D50d has elapsed, a first output period T51a of the next frame 510 starts. In the first output period T51a, similarly to the above-described first output period T50a, the light source unit 60 controls the luminescent wheel 700B and the color wheel 800B to emit green wavelength band light 91a as the composite color 900. Thereafter, the same operation is repeated.

As described above, according to the present embodiment, the light source unit 60 uses and synthesizes the light emitted from the red light source 121 and the yellow phosphor layer 312 as the light source of the red wavelength band light. For this reason, luminance can be secured as compared with the case in which the light source of the red wavelength band light is a red phosphor layer or a red light emitting diode alone. In addition, since the yellow wavelength band light is used in addition to the green wavelength band light, the blue wavelength band light, and the red wavelength band light as the light source, it is possible to project an entirely bright projected image on the screen or the like.

In addition, a user can freely select an image quality according to a specification environment of the projection apparatus 10 by switching between the first output mode and the second output mode. In addition, it is possible to set the second output period T50b to the fourth output period T50d to a different length. Therefore, the degree of freedom of image quality adjustment can be improved by changing brightness and color balance of the projected image according to the length of the output period of the light source light. That is, in the first output mode having the timing T7 for emitting the yellow light as shown in FIG. 8, it is possible to have more than two patterns. Specifically, by shifting timing T3B of a blue and red transmissive region 80cB of the color wheel 800B to be synchronized with the luminescent wheel 700B, an emission ratio of the blue light and the yellow light can be changed. As a result, for example, by decreasing a ratio of yellow light, a ratio of red, green, and blue of primary colors can be increased to improve color reproducibility.

Fourth Embodiment

Figure 10:
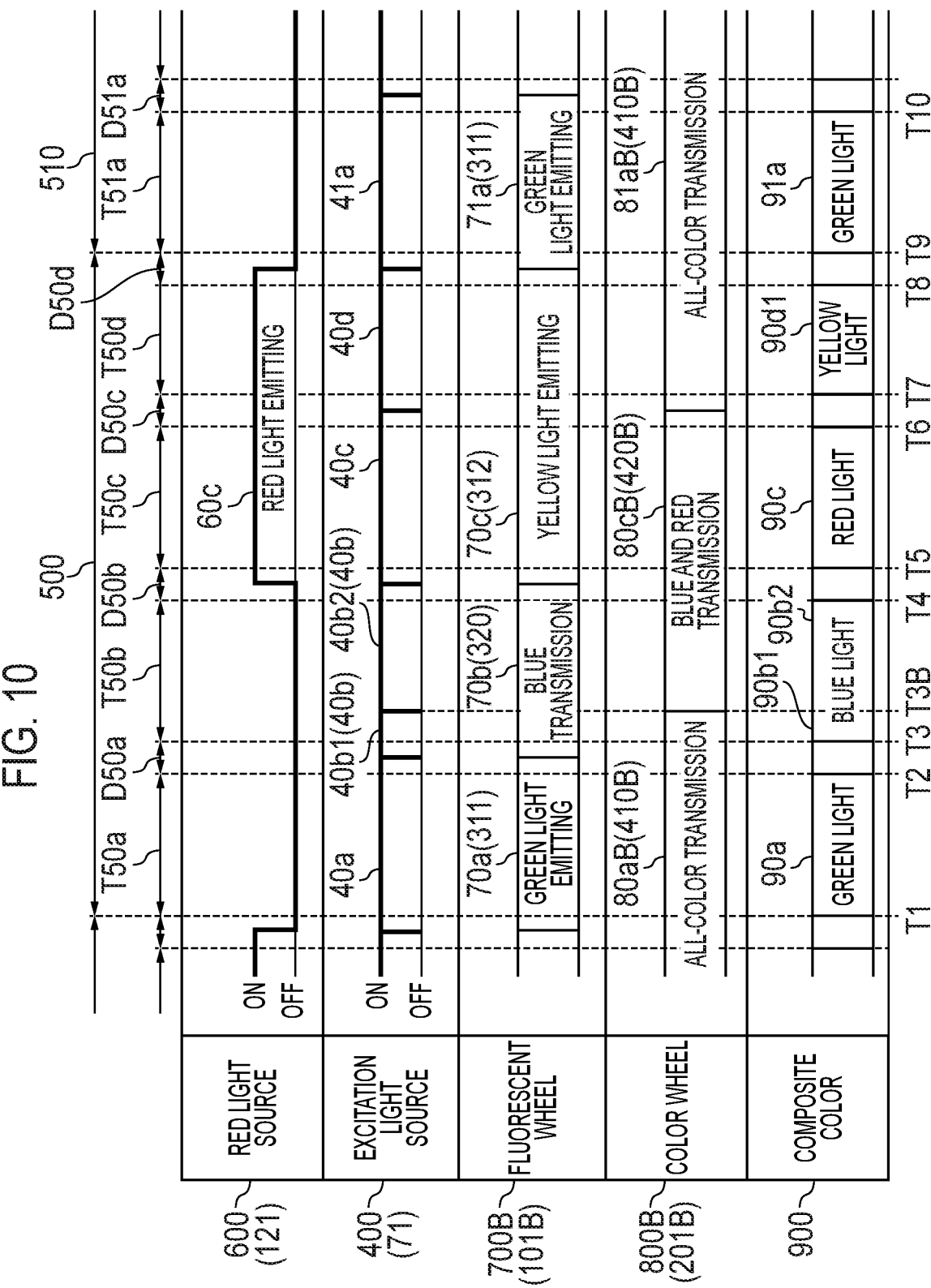
FIG. 10 is a timing chart of a first output mode of a light source unit according to a fourth embodiment of the present invention.

Next, a fourth embodiment will be described. In the first output mode of the third embodiment described above, some components of the blue wavelength band light are blocked in the blue and red transmissive region 80cB. It is assumed that the blue wavelength band lights 90b1 and 90b2 output in the second output period T50b become uneven or a color balance in the frame 500 becomes worse, for example, the blue wavelength band light 90b2 that has transmitted through the blue and red transmissive region 80cB becomes darker than the blue wavelength band light 90b1 that has transmitted through the all-color transmissive region 80aB. Therefore, in the present embodiment, an example in which the intensity of the output of a blue laser diode 71 is changed within the frame 500 will be described. FIG. 10 is a timing chart of a first output mode of a light source unit 60 according to the fourth embodiment.

The operations of the first output period T50a, the third output period T50c, and the fourth output period T50d are the same as those of the first output mode of the third embodiment shown in FIG. 8.

In the second output period T50b starting from timing T3, the red light source 600 puts out the red wavelength band light. In addition, since the transmissive region 320 is irradiated with blue wavelength band light 40b, the luminescent wheel 700B emits the blue wavelength band light 70b. In the second output period T50b, the color wheel 800B is controlled so that the all-color transmissive region 80aB and the blue and red transmissive region 80cB are sequentially positioned on an optical path. The blue wavelength band light 40b emitted from the luminescent wheel 700B is irradiated to the all-color transmissive region 80aB and the blue and red transmissive region 80cB. For this reason, the color wheel 800B transmits the blue wavelength band light 70b emitted from the luminescent wheel 700B.

In the present embodiment, in the second output period T50b, from the timing T3 to the timing T3B, blue wavelength band light 40b1 is emitted from the blue laser diode 71 with a low output (drive current). From the timing T3B to the timing T4, blue wavelength band light 40b2 is emitted from the blue laser diode 71 with a high output (drive current) that can compensate for a luminance difference from the timing T3 to the timing T3B. Further, the blue wavelength band lights 40a, 40c, and 40d as the excitation light in the first output period T50a, the third output period T50c, and the fourth output period T50d may be emitted at the same output, or may be emitted at different outputs by taking into consideration a luminance balance of the light source light or the like.

When the fourth output period T50d elapses, after the fourth mixed color period D50d has elapsed, a first output period T51a of the next frame 510 starts. In the first output period T51a, similarly to the above-described first output period T50a, the light source unit 60 controls the luminescent wheel 700B and the color wheel 800B to emit green wavelength band light 91a as the composite color 900. Thereafter, the same operation is repeated.

Further, the first output mode of the light source unit 60 of the present embodiment is controlled in the second output period T50b in the same manner as in the third embodiment.

As described above, in the second output period T50b from the timing T3 to the timing T4, the light source unit 60 of the present embodiment can emit uniform blue wavelength band lights 90b1 and 90b2 as the composite color 900, or emit the blue wavelength band light 90b1 and 90b2 with color balance taking into account the green wavelength band light 90a, the red wavelength band light 90c, and the yellow wavelength band light 90d1, which are different colors. For this reason, it is possible to adjust the luminance in each output period while setting the second output period T50b to the fourth output period T50d to different lengths, and it is possible to improve the degree of freedom of image quality adjustment.

The light source unit 60 according to each embodiment of the present invention includes the first light emitting element, the second light emitting element, the luminescent wheels 700, 700B, and the color wheels 800, 800A, and 800B synchronously rotating with the luminescent wheels 700, 700B, and emits a second wavelength band light in each output period and emits a first wavelength band light in an output period in which a fourth wavelength band light is emitted, in a plurality of output periods in the frame 500. For this reason, it is possible to provide the light source unit 60 and the projection apparatus 10 with reduced luminance decrease.

In addition, in the first output mode including an output period in which the fourth wavelength band light is incident on the second transmissive region and an output period in which the fourth wavelength band light is incident on the third transmissive region during a plurality of output periods in which the first wavelength band light is emitted, the light source unit 60 that synchronously controls the luminescent wheels 700 and 700B and the color wheels 800, 800A, and 800B can emit light of many colors as the composite color 900. For this reason, it is possible to provide the light source unit 60 that projects a bright projected image by emitting light for improving luminance as the light source light.

In addition, in the second output mode in which the fourth wavelength band light is incident on the third transmissive region during the plurality of output periods in which the first wavelength band light is emitted, the light source unit 60 that synchronously controls the luminescent wheels 700 and 700B and the color wheels 800, 800A, and 800B emits light of a specific wavelength band as the light source light for a long period as the composite light. Therefore, it is possible to provide the light source unit 60 that projects the projected image with improved color reproducibility.

In addition, the light source unit 60 in which the first wavelength band light, the second wavelength band light, the third wavelength band light, and the fourth wavelength band light are the red wavelength band light, the blue wavelength band light, the green wavelength band light, and the yellow wavelength band light, respectively can emit the light source light for color display of the projected image and can form the color image with high luminance.

It is to be noted that the above-described embodiments are presented as examples, and it is not intended to limit the scope of the invention. The novel embodiments can be implemented in various other forms, and various omissions, substitutions, and changes can be made without departing from the spirit of the invention. The embodiments and modifications thereof are included in the scope and gist of the invention and are included in the invention described in the claims and the equivalent scope thereof.

What is claimed is:

1. A light source unit comprising:
   a first light emitting element configured to emit a first wavelength band light;
   a second light emitting element configured to emit a second wavelength band light;
   a luminescent wheel configured to have a first fluorescent light emitting region irradiated with the second wavelength band light to emit a third wavelength band light, and a second fluorescent light emitting region that emits a fourth wavelength band light including a wavelength band of the first wavelength band light and the third wavelength band light having a wavelength band adjacent to the first wavelength band light being provided in parallel in a circumferential direction;
   a color wheel configured to have a second transmissive region that transmits the first wavelength band light to the fourth wavelength band light, and a third transmissive region that transmits only the first wavelength band light or transmits only the first wavelength band light and the second wavelength band light being installed in parallel in the circumferential direction, and synchronously rotate with the luminescent wheel; and a controller configured to cause the second wavelength band light to be emitted in each output period and the first wavelength band light to be emitted in the output period in which the fourth wavelength band light is emitted, in a plurality of output periods in a frame, wherein the controller is configured to cause the first wavelength band light and the fourth wavelength band light to be emitted by irradiating the second wavelength band light to the second fluorescent light emitting region, and;

the luminescent wheel has a first transmissive region irradiated with the second wavelength band light to transmit the second wavelength band light.

2. The light source unit according to claim 1, wherein the controller is configured to synchronously control the luminescent wheel and the color wheel by a first output mode including the output period in which the fourth wavelength band light is incident on the second transmissive region and the output period in which the fourth wavelength band light is incident on the third transmissive region, in the plurality of output periods in which the first wavelength band light is emitted.

3. The light source unit according to claim 1, wherein the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the second transmissive region;
   a third output period in which the first wavelength band light and the fourth wavelength band light are incident on the third transmissive region; and
   a fourth output period in which the first wavelength band light and the fourth wavelength band light are incident on the second transmissive region.

4. The light source unit according to claim 2, wherein the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the second transmissive region;
   a third output period in which the first wavelength band light and the fourth wavelength band light are incident on the third transmissive region; and
   a fourth output period in which the first wavelength band light and the fourth wavelength band light are incident on the second transmissive region.

5. The light source unit according to claim 1, wherein the third transmissive region transmits the first wavelength band light and the second wavelength band light; and
the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the third transmissive region;
   a third output period in which the first wavelength band light and the fourth wavelength band light are incident on the third transmissive region; and
   a fourth output period in which the first wavelength band light and the fourth wavelength band light are incident on the second transmissive region.

6. The light source unit according to claim 2, wherein the third transmissive region transmits the first wavelength band light and the second wavelength band light; and
the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the third transmissive region;
   a third output period in which the first wavelength band light and the fourth wavelength band light are incident on the third transmissive region; and
   a fourth output period in which the first wavelength band light and the fourth wavelength band light are incident on the second transmissive region.

7. The light source unit according to claim 1, wherein the third transmissive region transmits the first wavelength band light and the second wavelength band light; and
the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the second transmissive region; and
   a third output period and a fourth output period in which the first wavelength band light and the fourth wavelength band light are incident on the third transmissive region.

8. The light source unit according to claim 2, wherein the third transmissive region transmits the first wavelength band light and the second wavelength band light; and
the output period includes:
   a first output period in which the first wavelength band light is put out and the third wavelength band light is incident on the second transmissive region;
   a second output period in which the first wavelength band light is put out and the second wavelength band light that has transmitted through the first transmissive region is incident on the second transmissive region; and
   a third output period and a fourth output period in which the first wavelength band light and the fourth wavelength band light are incident on the third transmissive region.

9. The light source unit according to claim 3, wherein the third transmissive region transmits the first wavelength band light and the second wavelength band light; and
the output period includes:

a first output period in which the first wavelength band light is put out and the third wavelength band light is incident on the second transmissive region;

a second output period in which the first wavelength band light is put out and the second wavelength band light that has transmitted through the first transmissive region is incident on the second transmissive region; and a third output period and a fourth output period in which the first wavelength band light and the fourth wavelength band light are incident on the third transmissive region.

10. The light source unit according to claim 4, wherein
the third transmissive region transmits the first wavelength band light and the second wavelength band light; and the output period includes:

a first output period in which the first wavelength band light is put out and the third wavelength band light is incident on the second transmissive region;

a second output period in which the first wavelength band light is put out and the second wavelength band light that has transmitted through the first transmissive region is incident on the second transmissive region; and a third output period and a fourth output period in which the first wavelength band light and the fourth wavelength band light are incident on the third transmissive region.

11. The light source unit according to claim 5, wherein
the third transmissive region transmits the first wavelength band light and the second wavelength band light; and the output period includes:

a first output period in which the first wavelength band light is put out and the third wavelength band light is incident on the second transmissive region;

a second output period in which the first wavelength band light is put out and the second wavelength band light that has transmitted through the first transmissive region is incident on the second transmissive region; and a third output period and a fourth output period in which the first wavelength band light and the fourth wavelength band light are incident on the third transmissive region.

12. The light source unit according to claim 1, wherein
the first wavelength band light, the second wavelength band light, the third wavelength band light, and the fourth wavelength band light are a red wavelength band light, a blue wavelength band light, a green wavelength band light, and a yellow wavelength band light, respectively.

13. A projection apparatus comprising:

the light source unit according to claim 1;

a display element configured to generate an image light; and a projection optical system configured to project the image light emitted from the display element onto a screen, wherein the controller controls the light source unit or the display element.

14. A light source unit comprising:

a first light emitting element configured to emit a first wavelength band light;

a second light emitting element configured to emit a second wavelength band light which has different color from the first wavelength band light;

a luminescent wheel configured to have a first fluorescent light emitting region irradiated with the second wavelength band light to emit a third wavelength band light, and a second fluorescent light emitting region that emits a fourth wavelength band light including a wavelength band of the first wavelength band light and the third wavelength band light having a wavelength band adjacent to the first wavelength band light being provided in parallel in a circumferential direction;

a color wheel configured to have a second transmissive region that transmits the first wavelength band light to the fourth wavelength band light, and a third transmissive region that transmits only the first wavelength band light or transmits only the first wavelength band light and the second wavelength band light being installed in parallel in the circumferential direction, and synchronously rotate with the luminescent wheel; and a controller configured to cause the second wavelength band light to be emitted in each output period and the first wavelength band light to be emitted in the output period in which the fourth wavelength band light is emitted, in a plurality of output periods in a frame.

* * * * *